US011366906B2

(12) United States Patent
Smith et al.

(10) Patent No.: US 11,366,906 B2
(45) Date of Patent: Jun. 21, 2022

(54) DOMAIN-AUTHENTICATED CONTROL OF PLATFORM RESOURCES

(71) Applicant: Intel Corporation, Santa Clara, CA (US)

(72) Inventors: Ned M. Smith, Beaverton, OR (US); Steven L. Grobman, El Dorado Hills, CA (US); Craig T. Owen, Folsom, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/665,656

(22) Filed: Oct. 28, 2019

(65) Prior Publication Data

US 2020/0065496 A1 Feb. 27, 2020

Related U.S. Application Data

(63) Continuation of application No. 12/836,156, filed on Jul. 14, 2010, now Pat. No. 10,482,254.

(51) Int. Cl.
*G06F 21/57* (2013.01)
*G06F 9/4401* (2018.01)
(Continued)

(52) U.S. Cl.
CPC .......... *G06F 21/575* (2013.01); *G06F 9/4401* (2013.01); *G06F 9/45558* (2013.01);
(Continued)

(58) Field of Classification Search
CPC .. G06F 21/575; G06F 9/4401; G06F 9/45558; G06F 21/53
See application file for complete search history.

(56) References Cited

U.S. PATENT DOCUMENTS 6,484,262 B1 11/2002 Herzi
6,834,351 B1 * 12/2004 Kabenjian ............. G06F 21/572
707/999.009
(Continued)

FOREIGN PATENT DOCUMENTS

CN 101681257 A 3/2010
CN 101771689 A 7/2010
(Continued)

OTHER PUBLICATIONS

Office Action received for Japanese Patent Application No. 2013519728, dated Dec. 24, 2013, 2 pages of Japanese Office Action and 1 page of unofficial English translation.
(Continued)

*Primary Examiner* — Jason Chiang
(74) *Attorney, Agent, or Firm* — Jaffery Watson Mendonsa & Hamilton LLP (57) ABSTRACT

A method, apparatus, system, and computer program product for domain-authenticated control of platform resources. Resources under the control of the platform are managed in accordance with access control rules that are centrally managed by a directory service. Security policies are uniformly applied by requiring authorization of the user's access to platform resources including hard drives, flash memory, sensors, network controllers and power state controllers.

13 Claims, 6 Drawing Sheets

(51) Int. Cl.
*G06F 9/455* (2018.01)
*G06F 21/53* (2013.01)
*G06F 21/74* (2013.01)
*G06F 21/88* (2013.01)
*H04L 9/40* (2022.01)

(52) U.S. Cl.
CPC .............. *G06F 21/53* (2013.01); *G06F 21/74* (2013.01); *G06F 21/88* (2013.01); *G06F 2009/45587* (2013.01); *G06F 2221/2105* (2013.01); *G06F 2221/2141* (2013.01); *G06F 2221/2145* (2013.01); *G06F 2221/2147* (2013.01); *G06F 2221/2149* (2013.01); *H04L 63/061* (2013.01); *H04L 63/102* (2013.01)

(56) References Cited

U.S. PATENT DOCUMENTS

| | | | |
|---|---|---|---|
| 7,096,333 B2 | 8/2006 | McBrearty | |
| 7,657,746 B2 | 2/2010 | Paramasivam | |
| 7,774,824 B2* | 8/2010 | Ross | H04L 63/20 726/2 |
| 8,078,713 B1* | 12/2011 | Kim | G06F 21/54 709/223 |
| 8,468,591 B2* | 6/2013 | Silverstone | G06F 21/602 |
| 8,543,799 B2* | 9/2013 | McCarron | H04L 67/10 713/2 |
| 2002/0133330 A1* | 9/2002 | Loisey | H04L 67/16 703/27 |
| 2003/0041248 A1* | 2/2003 | Weber | G06F 21/85 713/182 |
| 2003/0167336 A1* | 9/2003 | Iwamoto | H04N 1/00509 709/229 |
| 2003/0177388 A1* | 9/2003 | Botz | H04L 63/0807 726/10 |
| 2004/0039937 A1 | 2/2004 | Aissi et al. | |
| 2004/0167984 A1 | 8/2004 | Hermann | |
| 2004/0215650 A1* | 10/2004 | Shaji | H04L 41/084 |
| 2005/0138423 A1* | 6/2005 | Ranganathan | G06F 21/305 726/4 |
| 2005/0246771 A1* | 11/2005 | Hunt | H04L 9/3273 726/18 |
| 2005/0262361 A1 | 11/2005 | Thibadeau | |
| 2006/0185001 A1* | 8/2006 | Stieglitz | H04L 63/20 726/4 |
| 2006/0190985 A1 | 8/2006 | Vasishth et al. | |
| 2006/0230280 A1* | 10/2006 | Zimmer | G06F 21/31 713/182 |
| 2006/0259782 A1 | 11/2006 | Wang et al. | |
| 2007/0016801 A1 | 1/2007 | Bade et al. | |
| 2007/0061561 A1 | 3/2007 | Hashiguchi | |
| 2007/0112772 A1 | 5/2007 | Morgan et al. | |
| 2007/0136581 A1* | 6/2007 | Hoghaug | H04L 9/3234 713/168 |
| 2007/0198844 A1 | 8/2007 | Morawetz et al. | |
| 2008/0052777 A1 | 2/2008 | Kawano et al. | |
| 2008/0104705 A1* | 5/2008 | Hasbun | H04L 63/104 726/26 |
| 2008/0148339 A1* | 6/2008 | Hill | G06F 21/85 726/1 |
| 2008/0162809 A1 | 7/2008 | Rothman et al. | |
| 2008/0271015 A1 | 10/2008 | Ibrahim | |
| 2008/0288782 A1 | 11/2008 | Iyer | |
| 2009/0070467 A1 | 3/2009 | Khosravi et al. | |
| 2009/0327702 A1* | 12/2009 | Schnell | H04L 9/0894 713/155 |
| 2010/0083355 A1 | 4/2010 | Brown | |
| 2010/0107238 A1 | 4/2010 | Stedman et al. | |
| 2010/0135498 A1* | 6/2010 | Long | H04L 9/0866 380/278 |
| 2010/0169640 A1* | 7/2010 | Smith | H04L 63/0815 713/155 |
| 2011/0083003 A1* | 4/2011 | Jaber | H04L 63/08 713/2 |
| 2011/0138166 A1 | 6/2011 | Peszek | |
| 2011/0154023 A1 | 6/2011 | Smith et al. | |
| 2011/0191834 A1 | 8/2011 | Singh et al. | |
| 2011/0283104 A1* | 11/2011 | Sangubhatla | H04L 67/04 713/168 |
| 2013/0281058 A1 | 10/2013 | Obaidi | |

FOREIGN PATENT DOCUMENTS

| | | |
|---|---|---|
| CN | 103003822 A | 3/2013 |
| CN | 1897006 A | 1/2017 |
| EP | 2204754 A1 | 7/2010 |
| EP | 2593898 A2 | 5/2013 |
| JP | 2004070875 A | 3/2004 |
| JP | 2004355137 A | 12/2004 |
| JP | 2006268861 A | 10/2006 |
| JP | 2007066123 A | 3/2007 |
| JP | 2007148466 A | 6/2007 |
| JP | 2008052704 A | 3/2008 |
| KR | 101471379 B1 | 12/2014 |
| WO | 2012009231 A2 | 1/2012 |

OTHER PUBLICATIONS

International Search Report and Written Opinion received for PCT Patent Application No. PCT/US2011/04341, dated Feb. 9, 2012, 9 pages.

International Preliminary Report on Patentability received for PCT/US2011/043411. dated Jan. 24, 2013. 6 pages.

Office Action received for Taiwanese Patent Application No. 100124610, dated Jan. 20, 2014, 7 pages of Taiwanese Office Action and 7 pages of unofficial English translation.

Office Action received for Korean Patent Application No. 2013-7000796. dated Mar. 11, 2014, 5 pages of Korean Office Action and 4 pages of unofficial English translation.

Allowance Decision of Examination received for Taiwanese Patent Application No. 100124610, dated May 9, 2014, 2 pages of Allowance Decision of Examination.

Decision for Grant received in Japanese Patent Application No. 2013-519728. dated Jun. 3, 2014, 1 page of Decision for Grant.

European Search Report, European Patent Application No. 118073321.2-1870 / 2593898 PCT/US2011043411, dated Sep. 19, 2014, 6 pages.

English translation of Chinese Office Action, Chinese Patent Application No. 201180034621.6, dated Nov. 15, 2014, 21 pages.

Chinese Office Action for Application No. 201180034621.6, dated Apr. 7, 2015, 9 pages.

* cited by examiner

DOMAIN-AUTHENTICATED CONTROL OF PLATFORM RESOURCES

CROSS REFERENCE TO RELATED APPLICATIONS

This application is a continuation of U.S. patent application Ser. No. 12/836,156, filed Jul. 14, 2010.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

TECHNICAL FIELD

The present disclosure relates generally to controlling access to resources of a computing platform.

BACKGROUND

Corporate data are increasingly mobile, distributed, and prolific. Data are routinely taken out of physically secured facilities to accommodate workers who travel or have flexible working habits. Data are also distributed geographically as corporations' business interests take them into other cities, states, and countries. Data are prolific in both the rate at which they are generated and in the multi-media formats in which they can be presented. All of these forces drive the evolution of new storage media, higher bandwidth subsystems, and network-connected storage that require that data be protected both while in transit and while at rest. Furthermore, computing platforms are becoming more mobile, smaller and light weight. Users are more likely to carry multiple computing devices. All these factors raise the likelihood of loss and theft which translates to increased capital expenditures as well as security risk due to increased potential for dictionary attacks on user passwords.

Data-at-rest (DAR) encryption technology prevents the unauthorized use of data stored on lost or stolen storage devices, thereby preventing these data from being spread on the Internet or other networks. DAR encryption acts as an automated and quick response mechanism to prevent the inevitable loss and theft of storage devices from becoming the loss and theft of the data stored on those devices. However, DAR encryption technology is often implemented using a single password to control access to encryption keys that can be used to decrypt the data stored on the encrypted hard drive. Similarly, hard drives are often protected using a single password. A thief who can guess the user's password can circumvent these common protection mechanisms.

DETAILED DESCRIPTION

Embodiments of the present invention may provide a method, apparatus, system, and computer program product for performing domain-authenticated control of platform resources. Resources under the control of the platform benefit from finer grain access control rules that are centrally managed by a directory service. Security policies can be uniformly applied by requiring authorization of the user's access to platform resources including hard drives, flash memory, sensors, network controllers and power state controllers.

In one embodiment, a method includes obtaining a domain credential for a platform prior to loading an operating system for the platform; authenticating the domain credential with a domain controller remote from the platform; identifying a resource of the platform that the domain credential has authority to access; and using the domain credential to unlock the resource of the platform prior to loading the operating system for the platform. The domain credential may include a credential for a user of the platform and/or a credential for a secure partition of the platform. Using the domain credential to unlock the resource may include using the domain credential to obtain a key to decrypt data stored on the resource and using the key to decrypt the data stored on the resource. Identifying the resource of the platform that the domain credential has authority to access may include reviewing an access policy for the platform maintained by the domain controller. Unlocking the resource of the platform may include establishing a secure communication session between the domain controller and the resource. Unlocking the resource may include providing power to the resource. The method may further include obtaining an unlock token from the domain controller, wherein unlocking the resource comprises using the unlock token to unlock the resource. The resource may comprise at least one of an ATA storage device and a chipset-controlled resource. A system and computer program product with instructions for implementing the method are also provided.

Reference in the specification to "one embodiment" or "an embodiment" of the present invention means that a particular feature, structure or characteristic described in connection with the embodiment is included in at least one embodiment of the invention. Thus, the appearances of the phrases "in one embodiment," "according to one embodiment" or the like appearing in various places throughout the specification are not necessarily all referring to the same embodiment.

For purposes of explanation, specific configurations and details are set forth in order to provide a thorough understanding of the present invention. However, it will be apparent to one of ordinary skill in the art that embodiments of the present invention may be practiced without the specific details presented herein. Furthermore, well-known features may be omitted or simplified in order not to obscure the present invention. Various examples may be given throughout this description. These are merely descriptions of specific embodiments of the invention. The scope of the invention is not limited to the examples given.

Figure 1:
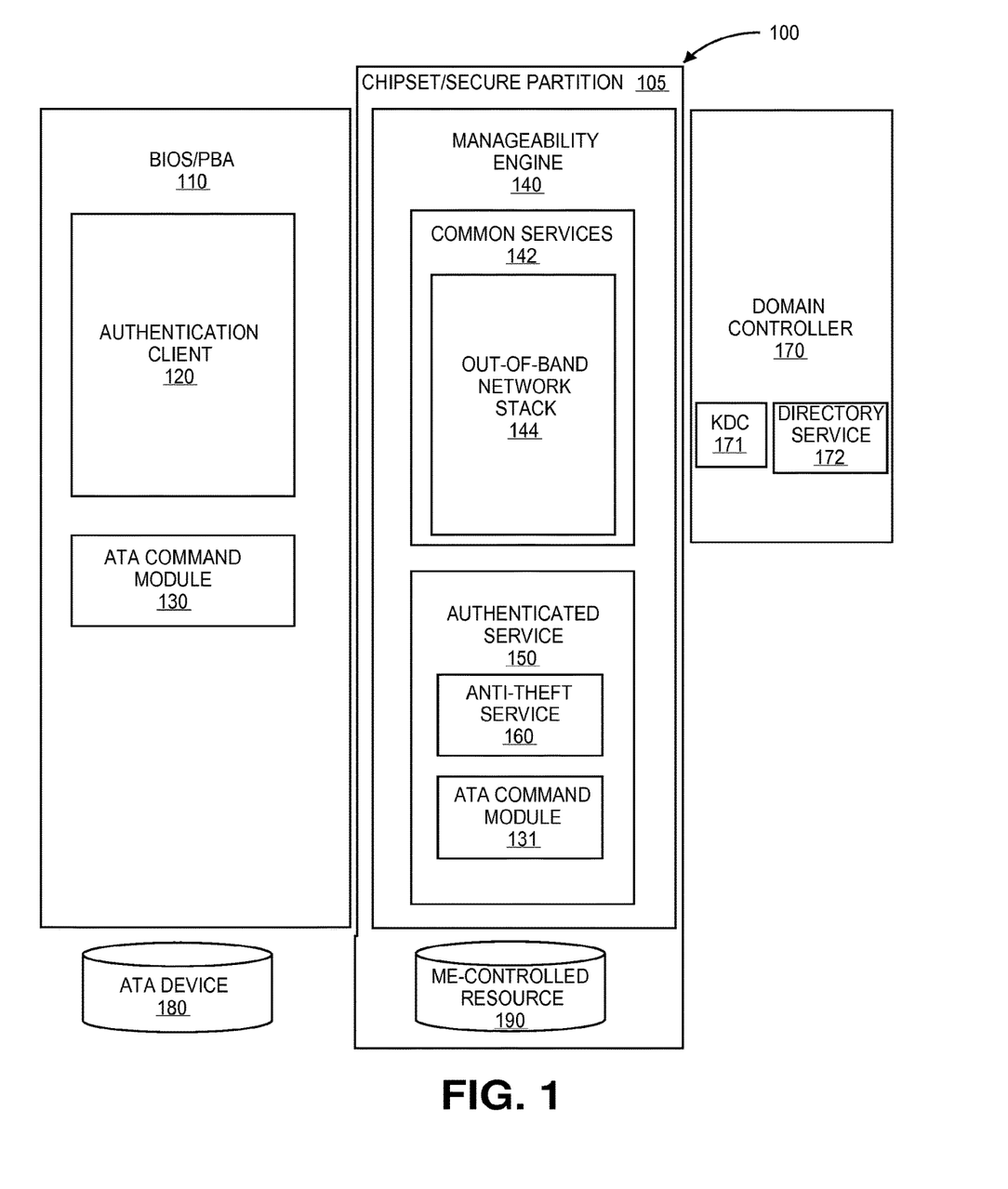
FIG. 1 is a block diagram of a system configured to provide domain-authenticated control of platform resources in accordance with one embodiment of the invention.

FIG. 1 is a block diagram of a platform 100 configured to provide domain-authenticated control of platform resources in accordance with one embodiment of the invention. Resources of platform 100 are illustrated by two different types of resources that may be available early during initialization of platform 100, Advanced Technology Attachment (ATA) devices 180 and ME-controlled resources 190. ATA devices 180 represents resources such as a hard drive for platform 100 that serves as storage for the platform firmware and software used to perform system initialization. Because of vulnerability during the boot process before protection mechanisms can be put into place, hard drives providing platform initialization firmware and software are often protected using hard drive passwords and/or full disk encryption. However, if a thief can guess the hard drive password or encrypted disk password, data on the hard drive may be accessed without further protection mechanisms such as those put into place by the present invention.

ME-controlled resources 190 represents resources that are managed by an enterprise data protection scheme implemented as management functionality in chipset/secure partition 105. For example, ME-controlled resources 190 may include sensors, power state controllers, network controllers, and flash memory that provides third party firmware and software used during platform initialization. Because of vulnerability during platform initialization and the possibility of viral infection of such third party firmware code, ME-controlled resources 190 are placed under the control of enterprise management software operating remotely from platform 100. ME-controlled resources 190 may therefore be updated via a secure channel between the enterprise management software and a manageability engine 140 operating within a secure partition, such as chipset/secure partition 105, on platform 100. The operation of manageability engine 140 in conjunction with enterprise management software is described in further detail below.

BIOS/PBA (pre-boot authentication) module 110 includes platform firmware used during system initialization. Originally developed for IBM PC Compatible computers, the Basic Input/Output System (BIOS), also known as the System BIOS, is a de facto standard defining a firmware interface. The BIOS is boot firmware, designed to be the first code run by a PC when powered on. The initial function of the BIOS is to identify, test, and initialize system devices such as the video display card, hard disk, and floppy disk and other hardware. This initialization prepares the machine into a known state, so that software such as an operating system stored on compatible media can be loaded, executed, and given control of the PC. This process is known as booting, or booting up, which is short for bootstrapping. BIOS/PBA 110 includes pre-boot authentication module to obtain user credentials prior to booting the operating system.

BIOS/PBA 110 includes authentication client 120 and Advanced Technology Attachment (ATA) command module 130 for communication with the platform resource ATA devices 180. Authentication client 120 performs domain authentication with domain controller 170 via out-of-band network stack 144 of manageability engine 140. Domain authentication can occur using a platform identity only, a user identity only, or a combination of a platform identity with a user identity.

Authentication client 120 will be described herein as interacting with domain controller 170 and other components of platform 100 using the Kerberos identity management infrastructure, but the invention is not so limited. Other identity management infrastructures may also be used, such as, for example, SAML (Security Assertion Markup Language), Card Space, Liberty Alliance, Public Key, and so on. Furthermore, while authentication client 120 is shown as being implemented as a part of BIOS/PBA module 110, authentication client 120 may alternatively be implemented as part of manageability engine 140 or another secure partition of platform 100.

In one embodiment, authentication client 120 operates in accordance with the Kerberos identity management infrastructure. Kerberos uses as its basis the symmetric Needham-Schroeder protocol. It makes use of a trusted third party, termed a key distribution center (KDC), which consists of two logically separate parts: an Authentication Server (AS) and a Ticket Granting Server (TGS). Kerberos works on the basis of "tickets" which serve to prove the identity of users.

The KDC maintains a database of secret keys; each entity on the network—whether a client or a server—shares a secret key known only to itself and to the KDC. Knowledge of this key serves to prove an entity's identity. For communication between two entities, the KDC generates a session key which they can use to secure their interactions. The security of the protocol relies heavily on participants maintaining loosely synchronized time and on short-lived assertions of authenticity called Kerberos tickets.

Under the Kerberos protocol, a client such as authentication client 120 authenticates itself to the Authentication Server (within KDC 171 of domain controller 170) and receives a ticket. (All tickets are time stamped.) Authentication client 120 then contacts the Ticket Granting Server of KDC 171, and using the ticket it demonstrates its identity and asks for a service. If authentication client 120 is eligible for the service, then the Ticket Granting Server sends another ticket to authentication client 120. Authentication client 120 then contacts the Service Server (in this example, authenticated service 150 within manageability engine 140), and using this ticket authentication client 120 proves that it has been approved to receive the service.

Manageability engine 140 includes common services 142, which includes out-of-band network stack 144. In one embodiment, manageability engine (ME) 140 provides a secure and isolated environment that cannot be accessed by the host operating system (not shown) for platform 100. In one embodiment, manageability engine (ME) 140 authenticates users, controls access to peripheral devices, manages encryption keys for protection of data stored on storage devices of platform 100 such as ATA devices 180 and ME-controlled resources 190, and provides an interface to domain controller 170 via out-of-band network stack 144.

ME common services 142 include services commonly needed by different firmware modules, and include security services, provisioning services, and networking services. Security services provided by ME common services 142 generally include user authentication consisting of both HTTP Digest and Kerberos authentication; domain authorization using Microsoft Active Directory and/or other services; clock synchronization services to synchronize client and server clocks; and security auditing services. Provisioning services provided by ME common services 142 are used in conjunction with an enterprise server (not shown) to provision enterprise software to platform 100.

Networking services provided by ME common services 142 comprise an out-of-band network stack 144, which may include support for services such as Transmission Transport Protocol/Internet Protocol (TCP/IP), Transport Layer Security (TLS), Hypertext Transport Protocol (HTTP), Simple Object Access Protocol (SOAP), Web Services for Manageability (WS-MAN), and a host-based TLS interface called the Local Manageability Service (LMS). Authentication client 120 uses out-of-band network stack 144 to communicate with domain controller 170.

Manageability engine 140 also includes authenticated service 150, which provides authenticated services in response to requests from clients such as authentication client 120 and manageability engine 140. In one embodiment, authenticated service 150 is a Kerberos service that controls access to platform resources that are controllable by manageability engine 140 and BIOS, including sensors, power controllers, network controllers, and integrated flash memory. For example, in an embodiment using a Kerberos identity management infrastructure, authenticated service 150 provides full-disk encryption key services to authentication client 120 in response to receiving a service ticket. In one embodiment, authenticated service 150 provides a token that serves as a decryption key to decrypt a storage device encrypted using full disk encryption technology.

In one embodiment, authenticated service 150 also includes anti-theft service 160.

Anti-theft service 160 is used in conjunction with an enterprise server component (not shown) of domain controller 170 to prevent theft of data from storage devices on platform 100 in the event that platform 100 is stolen. Anti-theft service 160 enables platform resources to be disabled and/or locked if platform 100 is reported stolen. In particular, anti-theft service 160 enables ME-controlled resources 190 to be accessed, including locking and unlocking, by an enterprise server (not shown) via out-of-band network stack 144. Control of anti-theft service 160 may be activated using its own user account; if platform 100 is stolen, then a user account may be accessed to activate anti-theft service 160 to disable platform 100 by controlling power to chipset controllers, sensors, and/or integrated flash memory.

In one embodiment, authenticated service 150 further includes an ATA command module 131 to allow direct communication between manageability engine 140 and ATA devices 180. This direct communication is discussed further below with reference to FIG. 2.

Domain controller 170 may include several back-end services, including a key distribution center (KDC) 171, a directory service 172 such as Microsoft Active Directory or Lightweight Directory Access Protocol (LDAP) service for maintaining access control policies for platform resources, and a resource and policy management system. Domain controller 170 may further include servers to provide infrastructure for identity management, such as an authentication server operating in accordance with the authentication service (AS) protocol and a ticket granting server operating in accordance with a ticket granting service (TGS) protocol. In one embodiment, a ticket issued by domain controller 170 may contain authorization attributes that are expressions of the access control policy from directory services 172, authorizing access to platform resources. Domain controller 170 may further include one or more enterprise servers to manage various domain-related services such as anti-theft service 160.

In one embodiment, the Kerberos protocol combined with authorization attribute payloads can convey access control rules for the various resources enumerated by the platform. This level of control is achieved using the Kerberos model by embedding a Kerberos service process in the chipset, authenticated service 150, that serves as a gate to access platform resources such as ATA storage devices 180 and ME-controlled resources 190. A Kerberos client, authentication client 120, also is embedded in the platform to authenticate users with the Kerberos Key Distribution Center (KDC) 171 and establish the user's role and privileges according to a centrally managed security policy contained in a directory service 172. Security policies can be uniformly applied by requiring a Kerberos ticket to authorize the user's access to platform resources including hard drives, flash memory, sensors, network controllers and power state controllers.

In one embodiment, domain controller 170 receives a domain credential for a platform, authenticates the domain credential, and provides an access policy to the platform in response to authenticating the domain credential. The access policy is used for identifying a resource of the platform that the domain credential has authority to access and the access policy includes a token to unlock the resource.

Figure 2:
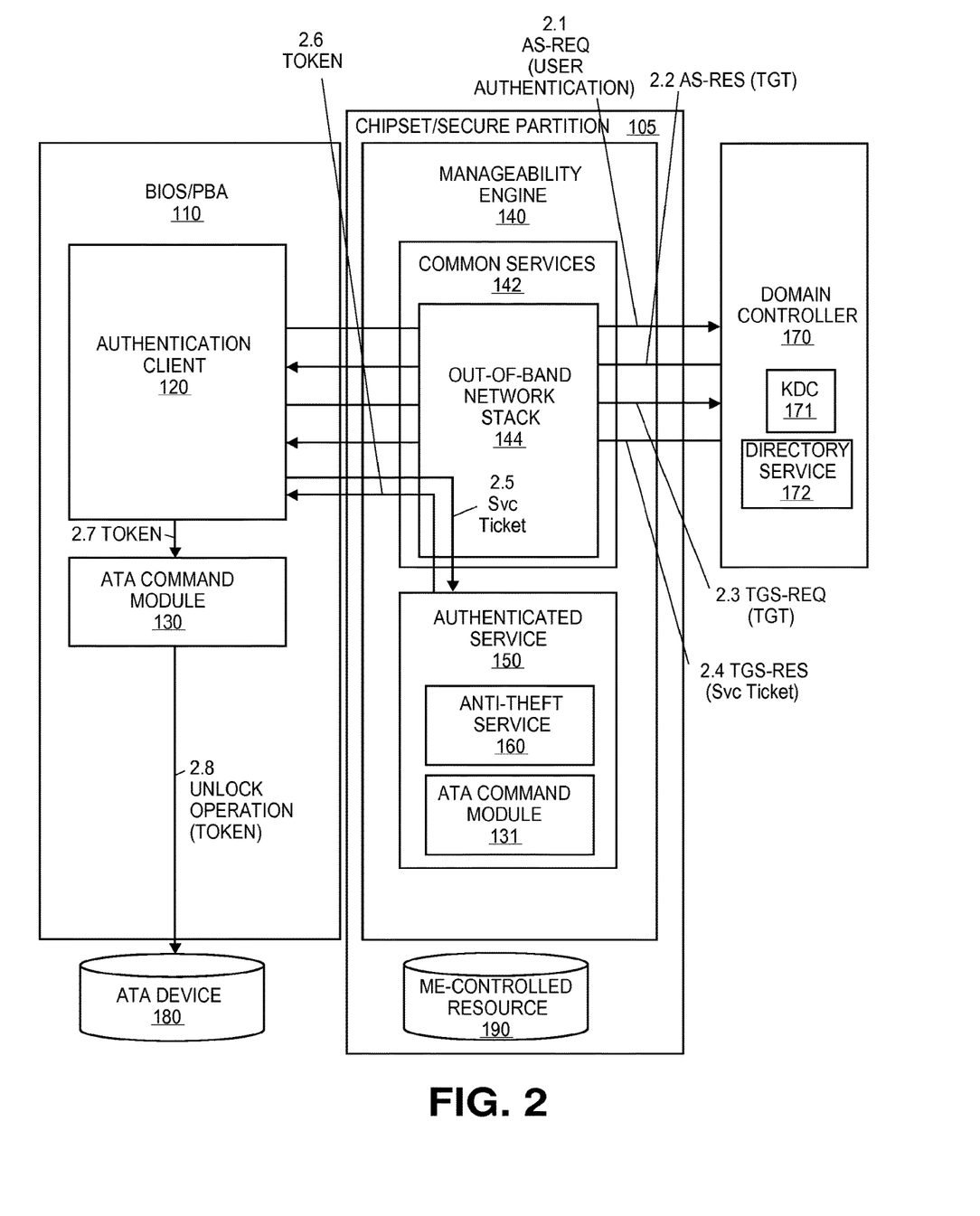
FIG. 2 is a flow diagram showing the unlocking of an encrypted storage device in response to authentication of user and/or platform credentials in accordance with one embodiment of the invention.

FIG. 2 is a flow diagram showing the unlocking of an encrypted storage device in response to authentication of user and/or platform credentials of the platform of FIG. 1 in accordance with one embodiment of the invention. As noted above, these credentials are obtained early in the platform initialization process, prior to booting the operating system, by platform firmware of BIOS/Pre-boot Authentication (PBA) module 110. In action 2.1, authentication client 120 obtains the user's credentials, such as during a login process, and provides the user's credentials to domain controller 170. In one embodiment, an identifier for the user that is managed by domain controller 170 is sent to a domain controller 170 authentication server (AS, not shown) as a request using the authentication server (AS) protocol via network stack 144 of manageability engine 140. The user's credentials may also be an identifier for the platform or may include both a platform identifier and a user identifier. This user and/or platform credentials are sent via network stack 144 of manageability engine 140 because, at this early stage in the initialization process prior to loading an operating system, network communication capabilities for the platform have not yet been initialized. By making use of platform configuration features for network communication provided by an enterprise management system, communications with domain controller 170 are possible even before network communication has been configured for the platform.

In action 2.2, a response to the request is sent by the authentication server of domain controller 170. The response includes a ticket granting ticket (TGT) for the authentication client 120 authorizing authentication client 120 to establish a connection to an authenticated service such as authenticated service 150 within the domain. In action 2.3, authentication client 120 uses the ticket granting ticket (TGT) to request access via a ticket granting service (TGS) protocol to an authenticated service such as authenticated service 150. As mentioned previously, in one embodiment, authenticated service 150 provides a token that serves as a decryption key to decrypt a storage device encrypted using full disk encryption technology.

In action 2.4, if access is permitted, a response in the form of a service ticket is issued by the ticket granting server (TGS, not shown) of domain controller 170 to authentication client 120. In action 2.5, authentication client 120 uses the service ticket to access authenticated service 150, which is a Kerberized full disk encryption service in this example. Authenticated service 150 reviews an access control policy associated with the client identity (from action 2.1). This access control policy is contained in the service ticket and provided by directory service 172 of domain controller 170. The access policy specifies which platform resources the authenticated client 120 may access. For example, the access policy may include a platform identifier, a storage device identifier, a device key, device firmware measurements for verification purposes, and access tokens for the device. Different types of resources may require different token structures and/or content, but the necessary information, token, or token values to access the resource will be included in the access policy provided as part of the service ticket. In response to receiving the service ticket, if access is permitted, authenticated service 150 (or a component thereof, such as anti-theft service 160 or ATA command module 131) obtains an access token from the access policy. In action 2.6, the access token is provided by authenticated service 150 to authentication client 120. In one embodiment, channel security between authentication client 120 and authenticated service 150 is provided by network stack 144 Transport Layer Security (TLS) using a Kerberos session key. This channel security protects against man-in-the-middle and replay attacks.

In action 2.7, the token is provided to ATA command module 130, which issues an unlock command to one or more of ATA devices 180 in action 2.8. The token may be supplied to ATA devices 180 in accordance with OPAL and IEEE1667 extensions to the Serial Advanced Technology Attachment (SATA) protocol.

In one embodiment, the access token is further protected end-to-end (from domain controller 170 to ATA devices 180) by having authenticated service 150 seal the access token to a given device of ATA devices 180. For example, the access token and a device identifier from the access policy may be encrypted along with a device nonce using the device key from the access policy. Authenticated service 150 has the device generate the device nonce when the blob is sealed. This encrypted sealed blob can be returned to authentication client 120 and then provided to ATA command module 130 and ATA devices 180. The nonce and the device ID may be verified by ATA command module 130 prior to issuing the unlock command to one or more of ATA devices 180.

In another embodiment, the access token is protected end-to-end (from domain controller 170 to ATA devices 180) in a process described as "organizational binding" by creating a TLS channel directly from manageability engine 140 to ATA devices 180. This implementation of end-to-end protection uses ATA command module 131 to access ATA devices 180 directly rather than going through authentication client 120 and ATA command module 130 of BIOS/PBA authentication module 110. In such an embodiment, an unlock token obtained as described with reference to action 2.5 above would be delivered directly over the TLS session from authenticated service 150 via ATA command module 131 to ATA devices 180, rather than going through authenticated client 120 and ATA command module 130 as described above with reference to actions 2.6 and 2.7. With this organizational binding implementation, the TLS protocol satisfies the nonce and seal requirements to protect the access token end-to-end.

Authenticated service 150 can ensure that ATA devices 180 are configured properly before decrypting stored data. Data is sealed to the device configuration by applying a key-derivation function (KDF) to the access token and a measurement of device firmware. For example, a Token T1' used to encrypt and decrypt data on a given device of ATA devices 180 can be calculated using a key derivation function applied to an access token T1 and a measurement of the device firmware (normally computed as a hash function of the firmware) H1. In this example, Token T1'=KDF (Token T1, Hash H1). A given device of ATA devices 180 obtains the measurement of device firmware by computing a cryptographic hash (e.g., SHA256 or AES-CMAC) of the device firmware and any relevant configuration settings. Authenticated service 150 obtains device firmware measurements from the manufacturer as part of firmware update distribution.

By protecting the device firmware using a cryptographic hash function, additional protection is provided against compromised device firmware illicitly obtaining encrypted data from ATA devices 180. Compromised device firmware would need to guess the value of the hash H1 value to derive the access token to decrypt data stored on a given device of ATA devices 180. Because the likelihood of guessing the correct hash H1 value is very low, the likelihood that data from encrypted ATA devices 180 could be illicitly obtained is very low.

Revocation of access rights to ATA devices 180 is centrally administered by authenticated service 150 in conjunction with domain controller 170. If an organization wishes to restrict both legitimate and illegitimate uses when a device is stolen, the administrator can delete the access token for the stolen device from the access policy for the authenticated service 150. Subsequent requests for access would fail, no service ticket would be delivered to authentication client 120 and thus actions 2.5 through 2.7 described above could not be completed.

In a situation where authentication credentials include both a user and a platform identifier, a Ticket Granting Ticket (TGT) as obtained in step 2.2 will include both identities. An access policy would be configured to include a tuple of (user identity, platform identity) as an identifier for the client.

Figure 3:
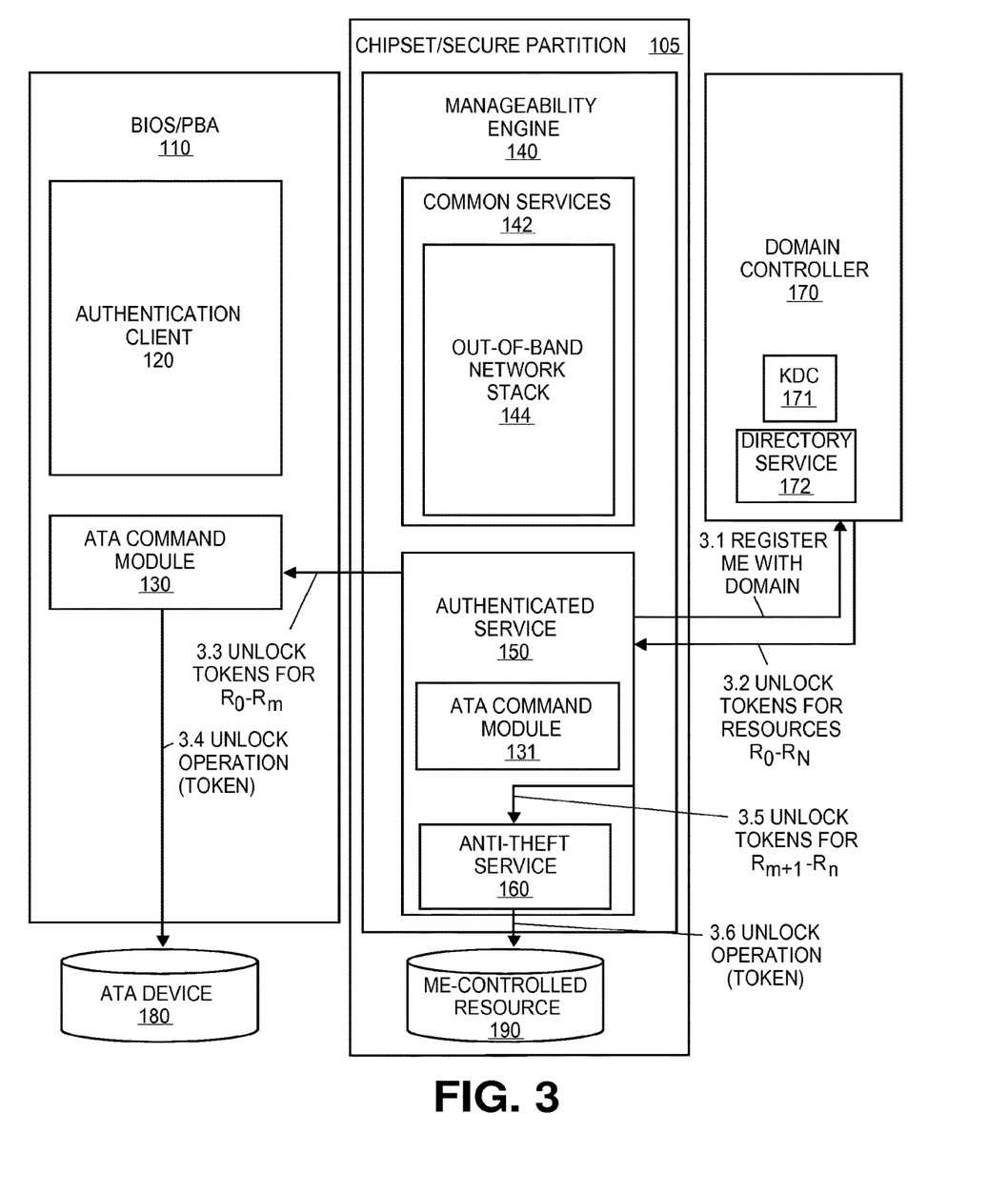
FIG. 3 is a flow diagram showing the unlocking of resources for anonymous user use in response to authentication of the platform in accordance with one embodiment of the invention.

FIG. 3 is a flow diagram showing the unlocking of resources for anonymous user use in response to authentication of the platform in accordance with one embodiment of the invention. In this example, a set of resources $R_0$ through $R_N$ is authorized for anonymous user access such that access is provided to all users of the platform when the platform has successfully been authenticated to the domain. In one embodiment, authenticating the platform to the domain involves authenticating a secure partition of the platform, such as manageability engine 140, with domain controller 170.

When network connectivity is established between platform 100 and domain controller 170, in action 3.1, authenticated service 150 registers with domain controller 170 to indicate its availability to service requests. Action 3.1 represents an automated request for activation of resources that do not require a user presence. For example, if the platform has not been reported stolen, then the chipset/secure partition 105 might be given a service ticket authorizing full power up. In contrast, if the platform were reported stolen, no service token authorizing power up of chipset/secure partition 105 would be given. In a situation where the platform is stolen, only authenticated service 150 needs to receive power to have an exchange with domain controller 170; all other chipset/secure partition 105 components can remain powered down. Domain controller 170 issues service tickets for authorized requestors in accordance with an access policy as described above with reference to actions 2.1 through 2.5 of FIG. 2. In this example, a service ticket would be issued to authenticated service 150.

In action 3.2, domain controller 170 provides unlock tokens for resources that require a cryptographic token. For resources to which access is enforced programmatically only without a requirement for a user presence being established, access policy information is provided to authenticated service 150.

Authenticated service 150 responds to commands from a host application to access storage devices such as ATA devices 180. In response to a request to unlock one or more ATA devices 180, in action 3.3, authenticated service 150 evaluates the access policy and provides unlock tokens for resources $R_0$ through $R_m$ (corresponding to ATA devices 180). ATA command module 130 formulates an appropriate ATA command supplying the appropriate token parameter to an ATA, OPAL, or other command that unlocks storage resources, and in action 3.4, the ATA device 180 is unlocked.

Authenticated service 150 also controls access to resources that are directly controlled by manageability engine 140, such as ME-controlled resources 190. For example, manageability engine 140 may directly control flash memory containing platform firmware.

Authenticated service 150 authorizes anti-theft service 160 to allow access to ME-controlled resources 190 (resource $R_{m+1}$ through $R_n$). If the resource being accessed requires a cryptographic token, as do at least some of ME-controlled resources 190 in this example, the cryptographic token is provided, as shown in action 3.5, to anti-theft service 160. In action 3.6, anti-theft service 160 issues a command to unlock ME-controlled resources 190.

Figure 4:
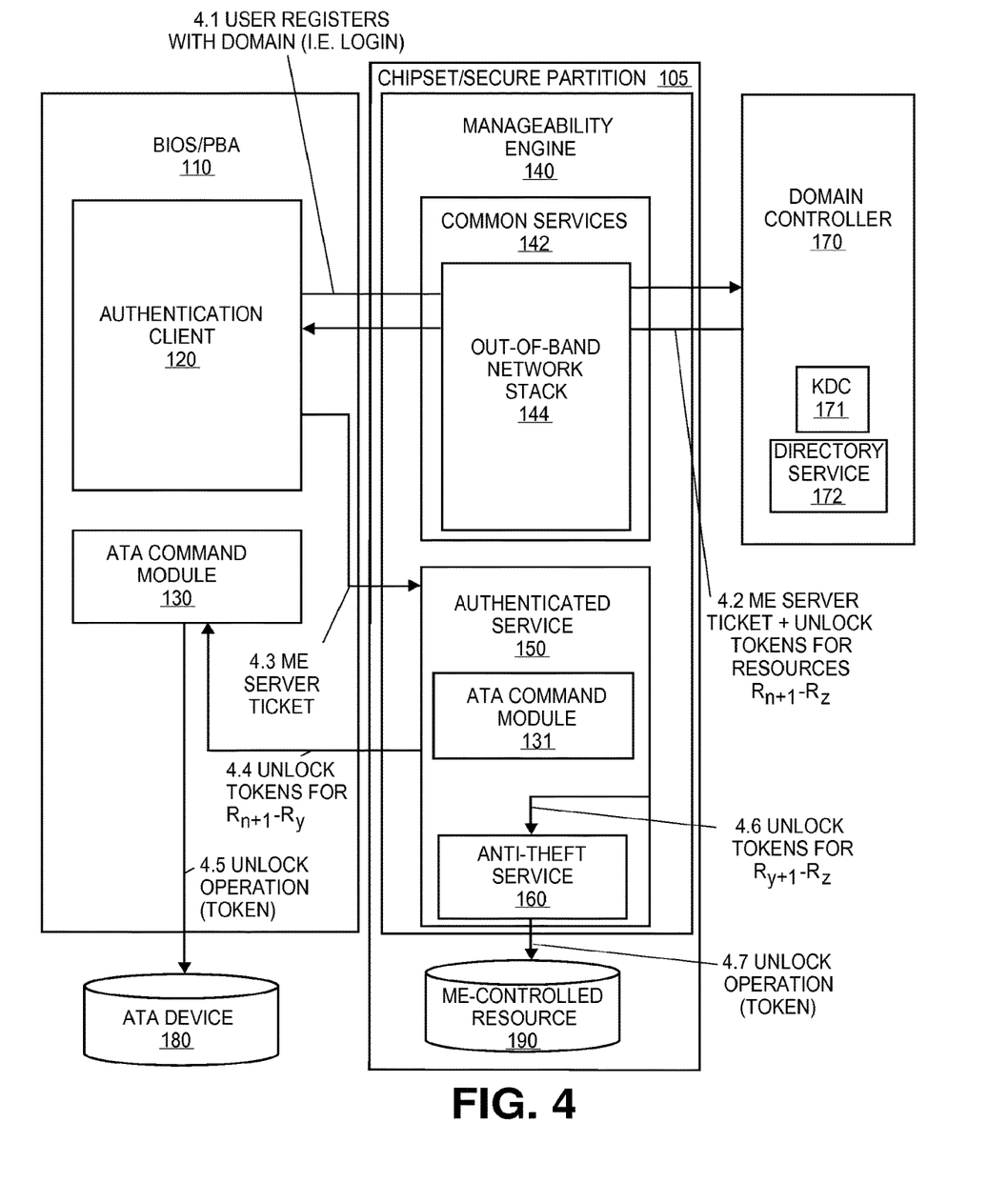
FIG. 4 is a flow diagram showing the unlocking of resources authorized for non-anonymous user use in response to authentication of both the platform and the user in accordance with one embodiment of the invention.

FIG. 4 is a flow diagram showing the unlocking of resources authorized for non-anonymous user use in response to authentication of both the platform and the user in accordance with one embodiment of the invention. This example assumes that the process of FIG. 3 has already taken place, such that a set of resources $R_0$ through $R_N$ have already been authorized for anonymous user access, and that the authenticated service 150 has already been registered with the domain controller 170. The following steps describe additional actions to authenticate and unlock additional resources $R_{N+1}$ through $R_Z$ to which the user has been verified to have access. In this example, resources $R_{N+1}$ through Ry are ATA resources to which the user has been verified to have access and resources $R_{Y+1}$ through $R_Z$ are ME-controlled resources to which the user has been verified to have access.

In action 4.1, the user registers with the domain. This user registration is performed in a manner similar to that performed in actions 2.1 through 2.5 of FIG. 2, using the out-of-band network stack 144 to communicate between authentication client 120 implemented in the BIOS/PBA 110 of the platform and domain controller 170. Because in this example, authentication service 150 has already registered with the domain, in action 4.2, an ME server ticket (i.e., a service ticket to access authenticated service 150 of manageability engine 140) is provided by domain controller 170 to authentication client 120. Domain controller 170 further evaluates the user's privileges and locates unlock tokens needed to grant access cryptographically, therefore providing unlock tokens for resources $R_{N+1}$ through $R_Y$, the ATA resources to which the user has been verified to have access, to authentication client 120. In action 4.3, authentication client 120 provides ME server ticket and the unlock tokens for resources $R_{N+1}$ through $R_Y$ to authenticated service 150 so that access privileges can be granted.

In action 4.4, in response to a request to access ATA devices 180 resources $R_{N+1}$ through $R_Y$, authenticated service 150 provides unlock tokens for resources $R_{N+1}$ through Ry to ATA command module 130. ATA command module 130 then issues an unlock command to ATA devices 180 and unlocks the device.

In action 4.6, authenticated service 150 provides unlock tokens for resources $R_{Y+1}$ through $R_Z$ to anti-theft service 160. In action 4.7, anti-theft service 160 unlocks ME-controlled resources 190. For example, the unlock token may enable or disable power to the chipset controllers and/or change the power state. In one embodiment, the unlock token contains a token value that is used to refresh a cached token value provided by domain controller 170.

Figure 5:
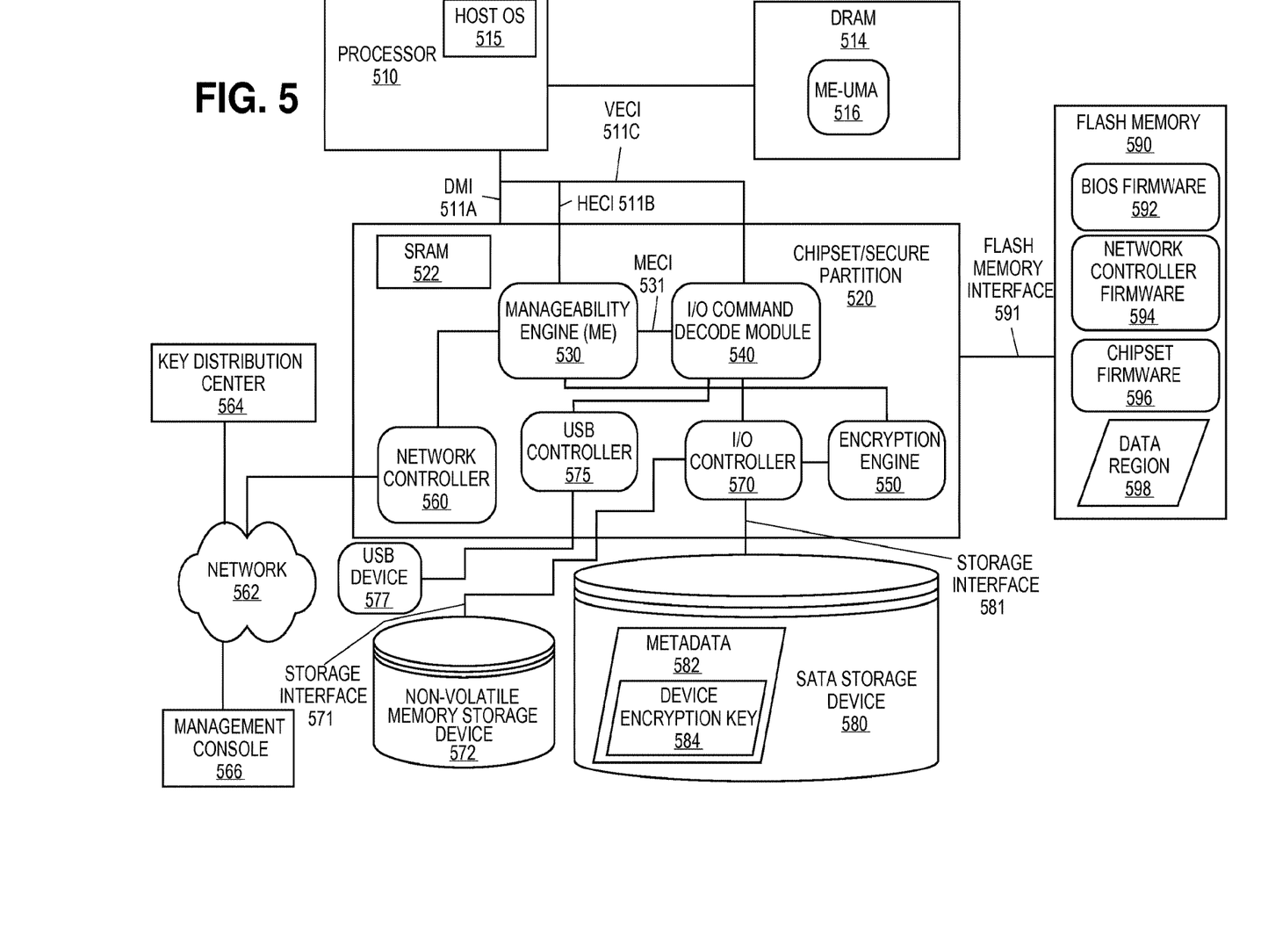
FIG. 5 is a block diagram of a system configured to provide domain-authenticated control of platform resources in accordance with one embodiment of the invention.

FIG. 5 is a block diagram of a system configured to domain authentication for control of platform resources in accordance with one embodiment of the invention. Platform 500, which corresponds to a host computer system, includes a processor 510 connected to a chipset 520 via a desktop management interface (DMI) 511. Processor 510 provides processing power to platform 500 and may be a single-core or multi-core processor, and more than one processor may be included in platform 500. Processor 510 may be connected to other components of platform 500 via one or more system buses, communication pathways or mediums (not shown).

Chipset 520 includes a manageability engine (ME) 530, which may be implemented as an embedded microprocessor that operates independently of host processor 510, to manage the configuration and operation of platform 500. In one embodiment, processor 510 operates under the direction of a host operating system (not shown), whereas manageability engine (ME) 530 provides a secure and isolated environment that cannot be accessed by the host operating system. In one embodiment, manageability engine (ME) 530 authenticates users, controls access to peripheral devices, manages encryption keys for protection of data stored on storage devices of platform 500, and provides an interface to enterprise services 570 via network controller 560. Using enterprise services 570, manageability engine (ME) 530 maintains consistency with enterprise-wide policies for configuration and management of platforms such as platform 500, including providing domain-authenticated control of platform resources in accordance with one embodiment of the invention.

Communication between ME 530 and enterprise services 570 occurs via out-of-band communication channel 571. In one embodiment, out-of-band communication channel 571 is a secure communication channel between the manageability engine (ME) 530 on the host system and enterprise services 570 that manages the host system. The encryption/decryption keys to enable secure communication between platform 500 and enterprise services 570 may be stored in the flash memory 590 of FIG. 5 during manufacture of chipset 520 and manageability engine (ME) 530.

In the embodiment shown in FIG. 5, manageability engine (ME) 530 is coupled to a microcontroller 540 via a Manageability Engine Controller Interface (MECI) 531. In one embodiment, microcontroller 540 is a general-purpose controller that performs storage command decoding and other accelerated operations. In the embodiment shown, manageability engine (ME) 530 controls the behavior of microcontroller 540, which in turn controls the behavior of storage controller 550. Microcontroller 540 includes drivers for storage controller 550 as well as the logic related to any disk encryption functionality. Storage controller 550 is the controller for storage devices such as storage device 552 and enables microcontroller 540 and ME 530 to access data stored on storage device 552.

Platform 500 further includes memory devices such as dynamic random access memory (DRAM) 512, static random access memory (SRAM) 522 within chipset 520, and flash memory 590, as well as storage device 552 accessible via storage controller 550. These memory devices may include random access memory (RAM) and read-only memory (ROM). For purposes of this disclosure, the term "ROM" may be used in general to refer to non-volatile memory devices such as erasable programmable ROM (EPROM), electrically erasable programmable ROM (EEPROM), flash ROM, flash memory, etc. Storage device 552 may include mass storage devices such as integrated drive electronics (IDE) hard drives, and/or other devices or media, such as floppy disks, optical storage, tapes, flash memory, memory sticks, digital video disks, biological storage, etc.

Flash memory 590 is accessible by chipset 520 via flash interface 591. Data stored on storage device 552 and/or in memory devices DRAM 512, SRAM 522, and flash memory 590 may be encrypted.

Flash memory 590 contains firmware used to initialize platform 500. This initialization firmware includes Basic Input/Output System (BIOS) firmware 592 to identify and initialize system component hardware (such as the video display card and hard disk) and some other hardware devices including manageability engine (ME) 530. BIOS firmware 592 prepares system component hardware of platform 500 to operate in a known low capability state, so other software programs stored on various media, including an operating system, can be loaded, executed, and given control of platform 500. BIOS firmware 592 includes BIOS/ME communication module 593, which enables the initial configuration of manageability engine (ME) 530 during the boot process. In one embodiment, manageability engine (ME) 530 registers with BIOS/ME communication module 593 to receive a notification just before an operating system is loaded for platform 500. This notification enables manageability engine (ME) 530 to perform certain instructions in preparation for the operating system being loaded.

Flash memory 590 also includes network controller firmware 595 to configure network controller 560, and chipset firmware 596 to configure chipset 520. Flash memory 590 also contains a data region 598. In one embodiment, data region 598 is encrypted and may only be read by manageability engine (ME) 530. Information used by ME 530 to provide domain-authenticated control of platform resources may be stored in data region 598 of flash memory 590 or on storage device 552.

Processor 510 may also be communicatively coupled to additional components, such as video controllers, small computer system interface (SCSI) controllers, network controllers, universal serial bus (USB) controllers, input devices such as a keyboard and mouse, etc. Platform 500 may also include one or more bridges or hubs, such as a memory controller hub, an input/output (I/O) controller hub, a PCI root bridge, etc., for communicatively coupling various system components. As used herein, the term "bus" may be used to refer to shared communication pathways, as well as point-to-point pathways.

Some components, such as network controller 560 for example, may be implemented as adapter cards with interfaces (e.g., a PCI connector) for communicating with a bus. In one embodiment, one or more devices may be implemented as embedded controllers, using components such as programmable or non-programmable logic devices or arrays, application-specific integrated circuits (ASICs), embedded computers, smart cards, and the like.

As used herein, the terms "processing system" and "data processing system" are intended to broadly encompass a single machine, or a system of communicatively coupled machines or devices operating together. Example processing systems include, without limitation, distributed computing systems, supercomputers, high-performance computing systems, computing clusters, mainframe computers, mini-computers, client-server systems, personal computers, workstations, servers, portable computers, laptop computers, tablets, telephones, personal digital assistants (PDAs), handheld devices, entertainment devices such as audio and/or video devices, and other devices for processing or transmitting information.

Platform 500 may be controlled, at least in part, by input from conventional input devices, such as keyboards, mice, etc., and/or by commands received from another machine, biometric feedback, or other input sources or signals. Platform 500 may utilize one or more connections to one or more remote data processing systems (not shown), such as through a network interface controller (NIC) 560, a modem, or other communication ports or couplings.

Platform 500 may be interconnected to other processing systems (not shown) by way of a physical and/or logical network, such as a local area network (LAN), a wide area network (WAN), an intranet, the Internet, etc. Communications involving a network may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

Figure 6:
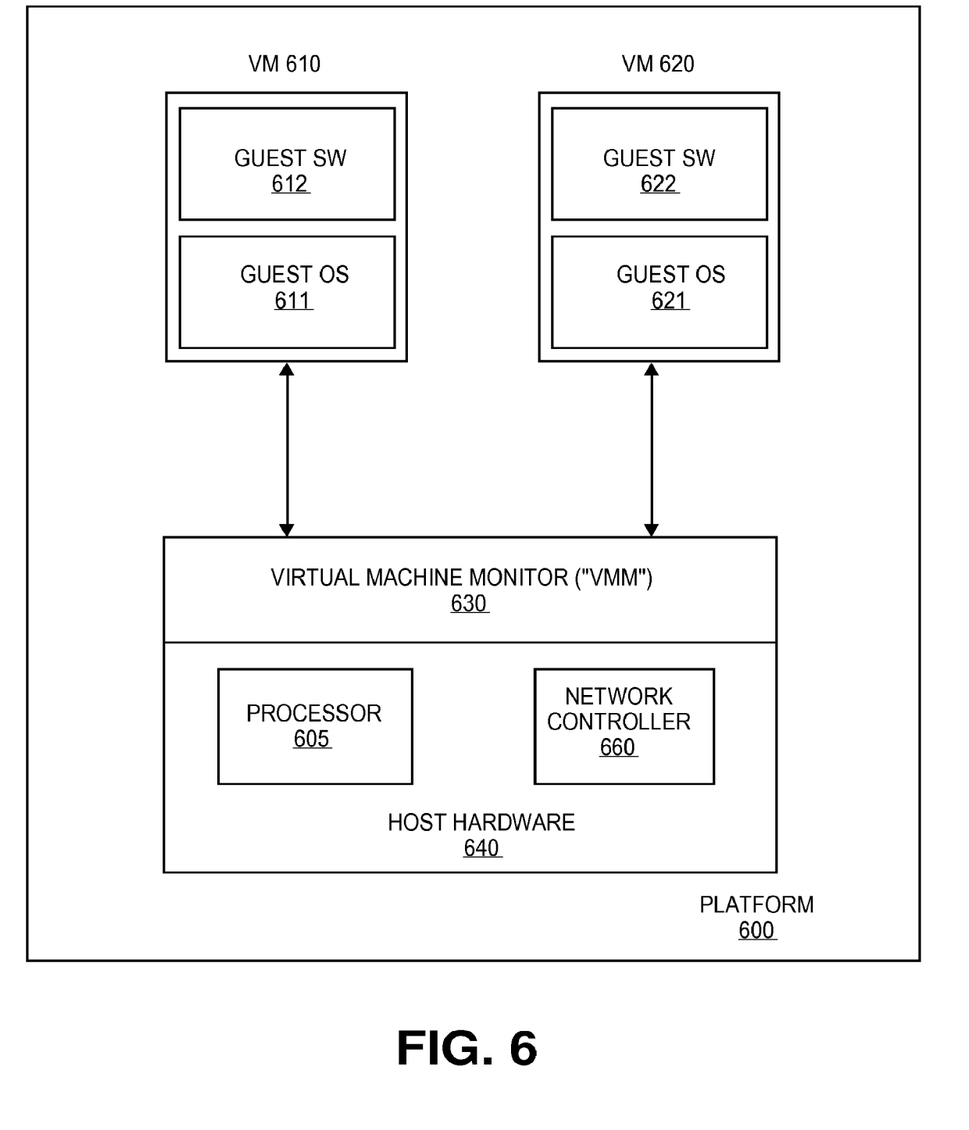
FIG. 6 shows a virtual machine environment for implementing a secure partition for providing domain-authenticated control of platform resources in accordance with one embodiment of the invention.

FIG. 6 shows a virtual machine environment for implementing a secure partition for providing domain-authenticated control of platform resources in accordance with one embodiment of the invention. If platform 600 is virtualized, it may include only a single processor but a virtual machine monitor ("VMM 630") on the host may present multiple abstractions and/or views of the host, such that the underlying hardware of the host appears as one or more independently operating virtual machines ("VMs"). VMM 630 may be implemented in software (e.g., as a standalone program and/or a component of a host operating system), hardware, firmware and/or any combination thereof. VMM 630 manages allocation of resources on the host and performs context switching as necessary to cycle between various VMs according to a round-robin or other predetermined scheme. It will be readily apparent to those of ordinary skill in the art that although only one processor is illustrated ("Processor 605"), embodiments of the present invention are not so limited and multiple processors may also be utilized within a virtualized environment.

Although only two VM partitions are illustrated ("VM 610" and "VM 620", hereafter referred to collectively as "VMs"), these VMs are merely illustrative and additional virtual machines may be added to the host. VM 610 and VM 620 may function as self-contained platforms respectively, running their own "guest operating systems" (i.e., operating systems hosted by VMM 630, illustrated as "Guest OS 611" and "Guest OS 621" and hereafter referred to collectively as "Guest OS") and other software (illustrated as "Guest Software 612" and "Guest Software 622" and hereafter referred to collectively as "Guest Software").

Each Guest OS and/or Guest Software operates as if it were running on a dedicated computer rather than a virtual machine. That is, each Guest OS and/or Guest Software may expect to control various events and have access to hardware resources on platform 600. Within each VM, the Guest OS and/or Guest Software may behave as if they were, in effect, running on platform 600's physical hardware ("Host Hardware 640", which may include a network controller 660).

It will be readily apparent to those of ordinary skill in the art that a physical hardware partition with a dedicated processor such as manageability engine (ME) 140 of FIG. 1 may provide a higher level of security than a virtualized partition (as illustrated in FIG. 6), but embodiments of the invention may be practiced in either environment and/or a combination of these environments to provide varying levels of security. It will also be readily apparent to those of ordinary skill in the art that an ME, AMT or PRL platform may be implemented within a virtualized environment. For example, VM 620 may be dedicated as an ME partition on a host while VM 610 runs typical applications on the host. In this scenario, the host may or may not include multiple processors. If the host does include two processors, for example, VM 620 may be assigned the other processor while VM 610 (and other VMs on the host) may share the resources of processor 605. On the other hand, if the host includes only a single processor, the processor may serve both the VMs, but VM 620 may still be isolated from the other VMs on the host with the cooperation of VMM 630. For the purposes of simplicity, embodiments of the invention are described in a manageability engine (ME) environment, but embodiments of the invention are not so limited. Instead, any reference to manageability engine, ME, a "partition", "a secure partition", a "security partition" and/or a "management partition" shall include any physical and/or virtual partition (as described above).

Upon start-up or when a new device is hot-plugged into the platform, VMM 630 assigns the device to a VM 610 or 620.

Flash memory 190 is also used to maintain user account metadata associated with each VM. When a storage device is to be unlocked using either a device password or a device encryption key, an additional check can be performed to ensure that the user account metadata in flash memory 190 corresponds to the VM to which the device was assigned.

VMM 630 ensures that transient VM environments do not result in unauthorized assignment of drives. In one embodiment, VMM 630 generates a GUID (globally unique ID) for each VM 610 and 620. The GUID is used to partition metadata in flash memory 190.

Embodiments of the mechanisms disclosed herein may be implemented in hardware, software, firmware, or a combination of such implementation approaches. Embodiments of the invention may be implemented as computer programs executing on programmable systems comprising at least one processor, a data storage system (including volatile and non-volatile memory and/or storage elements), at least one input device, and at least one output device.

Program code may be applied to input data to perform the functions described herein and generate output information. Embodiments of the invention also include machine-accessible media containing instructions for performing the operations of the invention or containing design data, such as HDL, which defines structures, circuits, apparatuses, processors and/or system features described herein. Such embodiments may also be referred to as program products.

Such machine-accessible storage media may include, without limitation, tangible arrangements of particles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash programmable memories (FLASH), electrically erasable programmable read-only memories (EEPROMs), magnetic or optical cards, or any other type of media suitable for storing electronic instructions.

The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the mechanisms described herein are not limited in scope to any particular programming language. In any case, the language may be a compiled or interpreted language.

Presented herein are embodiments of methods and systems for domain-authenticated control of platform resources. While particular embodiments of the present invention have been shown and described, it will be obvious to those skilled in the art that numerous changes, variations and modifications can be made without departing from the scope of the appended claims. Accordingly, one of skill in the art will recognize that changes and modifications can be made without departing from the present invention in its broader aspects. The appended claims are to encompass within their scope all such changes, variations, and modifications that fall within the true scope and spirit of the present invention.

What is claimed is:

1. A computer-implemented method comprising:
identifying, by a computer, a resource of the computer to be accessed; and
obtaining, by the computer, access to the resource based on a policy that is stored on a server computer that is remote from the computer, wherein obtaining includes receiving a domain credential prior to loading an operating system for the computer, wherein the domain credential is authenticated using a domain controller, and wherein the authenticated domain credential is used to unlock the resource of the computer prior to loading the operating system for the computer, and wherein resource is unlocked using an unlock token, wherein the domain controller to evaluate user privileges and authorization attributes and locate unlock tokens and provides the unlock tokens for resources limited to being accessible through cryptographic tokens, wherein the domain credential comprises at least one of a credential for a user of the computer and a credential for a secure partition of the computer, wherein the domain controller to authenticate the domain credential based on an out-of-band network stack.

2. The method of claim 1, further comprising:
using the domain credential to obtain a key to decrypt data stored on the resource; and
using the key to decrypt the data stored on the resource.

3. The method of claim 1, wherein
identifying the resource of the computer comprises reviewing an access policy for the computer maintained by the domain controller.

4. The method of claim 1, further comprising
establishing a secure communication session between the server and the resource to unlock the resource of the computer.

5. The method of claim 1, further comprising providing power to the resource to unlock the resource.

6. The method of claim 1, wherein the resource comprises at least one of an ATA device and a chipset-controlled resource.

7. A computer comprising:
circuitry to:
identify a resource of the computer to be accessed; and
obtain access to the resource based on a policy that is stored on a server that is remote from the computer, wherein to obtain includes to receive a domain credential prior to loading an operating system for the computer, wherein the domain credential is authenticated using a domain controller, and wherein the authenticated domain credential is used to unlock the resource of the computer prior to loading the operating system for the computer, and wherein resource is unlocked using an unlock token, wherein the domain controller to evaluate user privileges and authorization attributes and locate unlock tokens and provides the unlock tokens for resources limited to being accessible through cryptographic tokens, wherein the domain credential comprises at least one of a credential for a user of the computer and a credential for a secure partition of the computer, wherein the domain controller to authenticate the domain credential based on an out-of-band network stack.

8. The computer of claim 7, wherein the circuitry is further to:
use the domain credential to obtain a key to decrypt data stored on the resource; and
use the key to decrypt the data stored on the resource.

9. The computer of claim 7, wherein to identify the resource of the computer comprises to review an access policy for the computer maintained by the domain controller.

10. The computer of claim 7, wherein the circuitry is further to establish a secure communication session between the domain controller and the resource to unlock the resource of the computer.

11. The computer of claim 7, wherein the circuitry is further to provide power to the resource to unlock the resource.

12. The computer of claim 7, wherein the resource comprises at least one of an ATA device and a chipset-controlled resource.

13. A computer program product comprising:
a non-transitory computer-readable storage medium; and
instructions in the non-transitory computer-readable storage medium, wherein the instructions, when executed in a processing system, cause the processing system to perform operations comprising:
identifying a resource of a computer to be accessed; and
obtaining access to the resource based on a policy that is stored on a server that is remote from the computer, wherein obtaining includes receiving a domain credential prior to loading an operating system for the computer, wherein the domain credential is authenticated using a domain controller, and wherein the authenticated domain credential is used to unlock the resource of the computer prior to loading the operating system for the computer, and wherein resource is unlocked using an unlock token, wherein the domain controller to evaluate user privileges and authorization attributes and locate unlock tokens and provides the unlock tokens for resources limited to being accessible through cryptographic tokens, wherein the domain credential comprises at least one of a credential for a user of the computer and a credential for a secure partition of the computer, wherein the domain controller to authenticate the domain credential based on an out-of-band network stack.

* * * * *